United States Patent
Liang et al.

(10) Patent No.: US 8,351,650 B2
(45) Date of Patent: Jan. 8, 2013

(54) FOREGROUND ACTION ESTIMATING APPARATUS AND FOREGROUND ACTION ESTIMATING METHOD

(75) Inventors: Li Liang, Beijing (CN); Weiguo Wu, Beijing (CN)

(73) Assignee: Sony (China) Limited, Beijing (CN)

( * ) Notice: Subject to any disclaimer, the term of this patent is extended or adjusted under 35 U.S.C. 154(b) by 744 days.

(21) Appl. No.: 12/575,902

(22) Filed: Oct. 8, 2009

(65) Prior Publication Data

US 2010/0092074 A1 Apr. 15, 2010

(30) Foreign Application Priority Data

Oct. 10, 2008 (CN) .......................... 2008 1 0167492

(51) Int. Cl.
- G06K 9/00 (2006.01)
- G06K 9/62 (2006.01)
- G06K 9/34 (2006.01)
- G06K 9/40 (2006.01)
- G06F 3/033 (2006.01)
- H04H 60/56 (2008.01)
- G09G 5/00 (2006.01)

(52) U.S. Cl. ........ 382/103; 382/159; 382/173; 382/260; 715/863; 725/12; 345/156

(58) Field of Classification Search .................. 382/103, 382/159, 173, 260; 715/863; 345/156; 725/12
See application file for complete search history.

(56) References Cited

U.S. PATENT DOCUMENTS

| | | | |
|---|---|---|---|
| 6,301,370 B1 | 10/2001 | Steffens et al. | |
| 7,653,238 B2 * | 1/2010 | Stentiford | 382/162 |
| 2003/0103647 A1 | 6/2003 | Rui et al. | |
| 2004/0066970 A1 * | 4/2004 | Matsugu | 382/217 |
| 2005/0129278 A1 | 6/2005 | Rui et al. | |
| 2005/0147278 A1 | 7/2005 | Rui et al. | |
| 2005/0188013 A1 | 8/2005 | Rui et al. | |
| 2005/0210103 A1 | 9/2005 | Rui et al. | |
| 2006/0187305 A1 * | 8/2006 | Trivedi et al. | 348/169 |
| 2008/0085048 A1 * | 4/2008 | Venetsky et al. | 382/153 |

* cited by examiner

*Primary Examiner* — Kathleen Y Dulaney
(74) *Attorney, Agent, or Firm* — Oblon, Spivak, McClelland, Maier & Neustadt, L.L.P.

(57) ABSTRACT

The present invention provides a foreground action estimating apparatus and a foreground action estimating method, wherein the foreground action estimating apparatus includes: a training image inputting means for inputting a foreground image, a background image and an image having the foreground and background images as training images; a basis matrix calculating means for calculating a foreground basis matrix and a background basis matrix by respectively extracting a foreground feature and a background feature from the foreground image and the background image, respectively, and combining the foreground basis matrix and the background basis matrix to obtain a combined basis matrix; a feature suppressing means for calculating the feature coefficients of the training images in accordance with the combined basis matrix obtained by the basis matrix calculating means so as to obtain image features of the background-feature-suppressed training images; and a foreground action information acquiring means for estimating foreground action information in accordance with a feature mapping matrix from the image feature to an action information set, by using the background-feature-suppressed image features.

16 Claims, 6 Drawing Sheets

FOREGROUND ACTION ESTIMATING APPARATUS AND FOREGROUND ACTION ESTIMATING METHOD

BACKGROUND OF THE PRESENT INVENTION

1. Field of the Present Invention

The present invention relates to the field of computer vision and machine learning, more particularly, to a foreground action estimating apparatus and a foreground action estimating method.

2. Description of the Related Art

The recognizing of a three-dimensional posture of human body from a two-dimensional image is a heat subject in the field of computer vision and artificial intelligence, and this technique can be applied to various fields such as human-computer interaction, video monitoring, analysis and comprehension of digital information, and the like. However, this technique is also a challenge at present for the following reasons: (1) loss of depth information in a two-dimensional image causes indefiniteness of conclusion of three-dimensional information from the two-dimensional image, i.e. the three-dimensional information may include a plurality of possible solutions; (2) human images have many factors such as change in background, change in illumination, change in clothes, different visual angles, different postures, and the like, which greatly influence the conclusion of the three-dimensional posture; and (3) human posture is formed by combination and connection of a plurality of articulations, and a dimension of a posture space formed by the human posture is huge, hence it costs a large number of calculations to search for the optimum posture from the posture space.

From the point of technique principle, the method for estimating human posture from a single view image may be divided into a model-based method and a learning-based method. The model-based method is a method in which human model composed of each part of human body is constructed first, the process of posture estimating is the process of searching and matching the closest posture from a feature space using the model, and the process of searching is generally converted into a nonlinear optimization problem or a probability density estimating problem. Since the dimension of the posture space is huge, it is necessary to combine this method with tracking such that a good effect can be obtained. Therefore, a posture estimation effect mostly depends upon the initialization of the model before tracking, and in general, these methods also need to obtain the region of each part of human body in advance. The learning-based method is a method in which a three-dimensional posture of human body is directly concluded from the image feature. The image feature used frequently is human profile information, and motion analysis method, background modeling method or a combination thereof has been used for obtaining reliable profile information, however, it is difficult to separate human profile reliably by these methods in case of a complicated background. In addition, other features which have been already used may be trunk detection, complexion information, and the like.

At present, most methods depend upon image division or cluster, thus it is difficult to obtain a good effect in case of a complicated background. A. Agarwal has proposed a method of learning a foreground feature from an image feature, in which human posture feature is modeled using nonnegative matrix factorization so as to extract the foreground feature, the method has a higher flexibility in application since a step of image division is avoided, however, relative influence of a background feature and a foreground feature is not taken into consideration during background feature suppression in this method, hence, some part of background features would be also regarded as foreground features during feature reestablishion, thus influencing the background suppression effect.

Thus, the existing object recognition method and system generally require separating a foreground object from the background first, and it is difficult to obtain a good separation effect under a complicated background, hence a method capable of modeling a foreground feature and a background feature to achieve a better effect of background feature suppression is desired.

SUMMARY OF THE PRESENT INVENTION

In view of the problem in the related art, the present invention provides a foreground action estimating apparatus and a foreground action estimating method capable of directly suppressing a background feature of an image to relatively strengthen a foreground feature in the suppressed image such that a method of obtaining the foreground feature using image division or background difference is avoided, and then a three-dimensional posture of human body is estimated based on a background-feature-suppressed image feature whereby accuracy of posture estimating is improved.

According to an aspect of the present invention, there is provided a foreground action estimating apparatus for estimating foreground actions in a picture, comprising: a training image inputting means for inputting a foreground image, a background image and an image having the foreground and background images as training images; a basis matrix calculating means for calculating a foreground basis matrix and a background basis matrix by respectively extracting a foreground feature and a background feature from the foreground image and the background image, respectively, and combining the foreground basis matrix and the background basis matrix to obtain a combined basis matrix; a feature suppressing means for calculating the feature coefficients of the training images in accordance with the combined basis matrix obtained by the basis matrix calculating means so as to obtain background-feature-suppressed image features of the training images; and a foreground action information acquiring means for estimating foreground action information in accordance with a feature mapping matrix from the image features to an action information set, by using the background-feature-suppressed image features.

Wherein, the sizes of the foreground image, the background image, and the training images are uniform.

Additionally, the foreground action estimating apparatus in accordance with the present invention further comprises a storage unit for storing the action information set, wherein the foreground image and the training images correspond to the same action in the action information set.

The feature suppressing means comprises: a feature extracting unit for extracting the image features of the training images; a calculating unit for calculating the feature coefficients of the image features in the combined basis matrix; a separating unit for separating a background basis coefficient from the feature coefficients so as to obtain a foreground basis coefficient; and a reestablishing unit for reestablishing the background-feature-suppressed image features of the training images by a predetermined algorithm by using the foreground basis coefficient and the foreground basis matrix.

In the present invention, the predetermined algorithm in the reestablishing unit is Universal Matrix Multiplication. The foreground basis matrix and the background basis matrix in the basis matrix calculating means are obtained at least via non-negative matrix factorization. The foreground includes at least a person and the action includes at least a posture.

The foreground feature, the background feature, and the image features are statistical features of the foreground image, the background image, and training images in an edge direction and include at least a HoG (Histograms of Oriented Gradients) feature and a SIFT (Scale Invariant Feature Transform) feature.

In accordance with another aspect of the present invention, there is provided a foreground action estimating method for estimating foreground actions in a picture, comprising the following steps: a training image inputting step for inputting a foreground image, a background image and an image having the foreground and background images as training images; a basis matrix calculating step for calculating a foreground basis matrix and a background basis matrix by respectively extracting a foreground feature and a background feature from the foreground image and the background image, respectively, and combining the foreground basis matrix and the background basis matrix to obtain a combined basis matrix; a feature suppressing step for calculating the feature coefficients of the training images in accordance with the combined basis matrix obtained in the basis matrix calculating step to obtain image features of the background-feature-suppressed training images; and a foreground action information acquiring step for estimating foreground action information in accordance with a feature mapping matrix from the image features to an action information set, by using the background-feature-suppressed image features.

Wherein, the sizes of the foreground image, the background image, and the training images are uniform.

Additionally, the foreground action estimating method further comprises an action information set storing step, wherein the foreground image and the training images correspond to the same action in the action information set. The foreground includes at least a person and the action includes at least a posture.

The feature suppressing step executes the processing of: extracting the image features of the training images; calculating the feature coefficients of the image features in the combined basis matrix; separating a background basis coefficient from the feature coefficients so as to obtain a foreground basis coefficient; and reestablishing the background-feature-suppressed image features of the training images by a predetermined algorithm via the foreground basis coefficient and the foreground basis matrix.

In the present invention, the predetermined algorithm is Universal Matrix Multiplication. The foreground feature, the background feature, and the image features are statistical features of the foreground image, the background image, and training images in an edge direction and include at least a HoG feature and a SIFT feature.

In the basis matrix calculating step, the foreground basis matrix and the background basis matrix are obtained at least via non-negative matrix factorization.

Therefore, in accordance with the present invention, a background feature in an image having a complicated background is suppressed such that a foreground feature (human posture information) is remained and relatively strengthened, and accuracy of estimation of a three-dimensional posture of human body from a two-dimensional single view image is remarkably improved.

Other features and advantages of the present invention should be described in the following description, and will be partly apparent from the description or be understood by implementing the present invention. Objects and other advantages of the present invention may be carried out and obtained by the structure as specially described in the description, claims as well as the accompanying drawings.

BRIEF DESCRIPTION OF THE DRAWINGS

The accompanying drawings, which are included to provide a further understanding of the present invention and constitute a part of the description, serve to explain the principles of the present invention together with embodiments of the present invention without limiting the present invention.

DETAILED DESCRIPTION OF THE PREFERRED EMBODIMENTS

Hereinafter, preferred embodiments of the present invention will be described with reference to the drawings. It should be understood that the preferred embodiments described herein is for illustrating and explaining the present invention instead of limiting the present invention.

Figure 1:
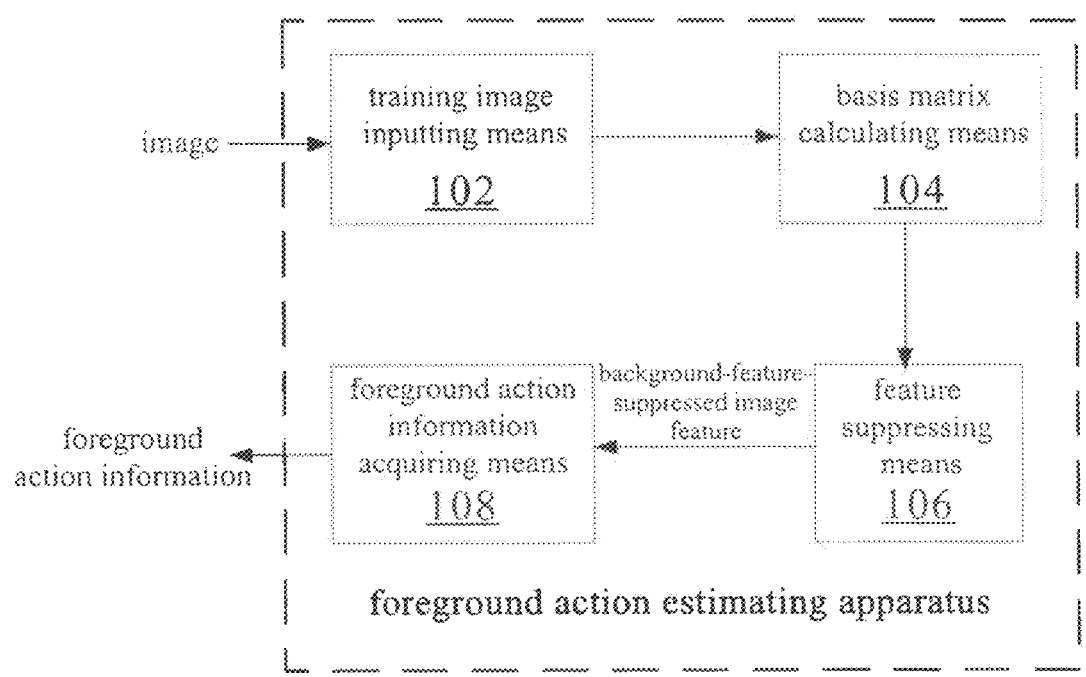
FIG. 1 is a block diagram of a foreground action estimating apparatus according to the present invention.

FIG. 1 is a block diagram of a foreground action estimating apparatus 100 according to the present invention. As shown in FIG. 1, the apparatus 100 comprises a training image inputting means 102 for inputting a foreground image, a background image and an image having the foreground and background images as training images; a basis matrix calculating means 104 for calculating a foreground basis matrix and a background basis matrix by respectively extracting a foreground feature and a background feature from the foreground image and the background image, respectively, and combining the foreground basis matrix and the background basis matrix to obtain a combined basis matrix; a feature suppressing means 106 for calculating the feature coefficients of the training images in accordance with the combined basis matrix obtained by the basis matrix calculating means 104 to obtain background-feature-suppressed image features of the training images; and a foreground action information acquiring means 108 for estimating foreground action information using the background-feature-suppressed image features in accordance with a feature mapping matrix from the image features to an action information set, by using the background-feature-suppressed image features.

Wherein, the sizes of the foreground image, the background image, and the training images are uniform.

Additionally, the foreground action estimating apparatus in accordance with the present invention further comprises a storage unit for storing the action information set, wherein the foreground image and the training images correspond to the same action in the action information set.

The feature suppressing means 106 comprises: a feature extracting unit for extracting the image features of the training images; a calculating unit for calculating the feature coefficients of the image features in the combined basis matrix; a separating unit for separating a background basis coefficient from the feature coefficients so as to obtain a foreground basis coefficient; and a reestablishing unit for reestablishing the background-feature-suppressed image features of the training images by a predetermined algorithm by using the foreground basis coefficient and the foreground basis matrix.

In the present invention, the predetermined algorithm in the reestablishing unit is Universal Matrix Multiplication. The foreground basis matrix and the background basis matrix in the basis matrix calculating means are obtained at least via non-negative matrix factorization. The foreground includes at least a person and the action includes at least a posture.

The foreground feature, the background feature, and the image features are statistical features of the foreground image, the background image, and training images in an edge direction and include at least a HoG feature and a SIFT feature.

Figure 2:
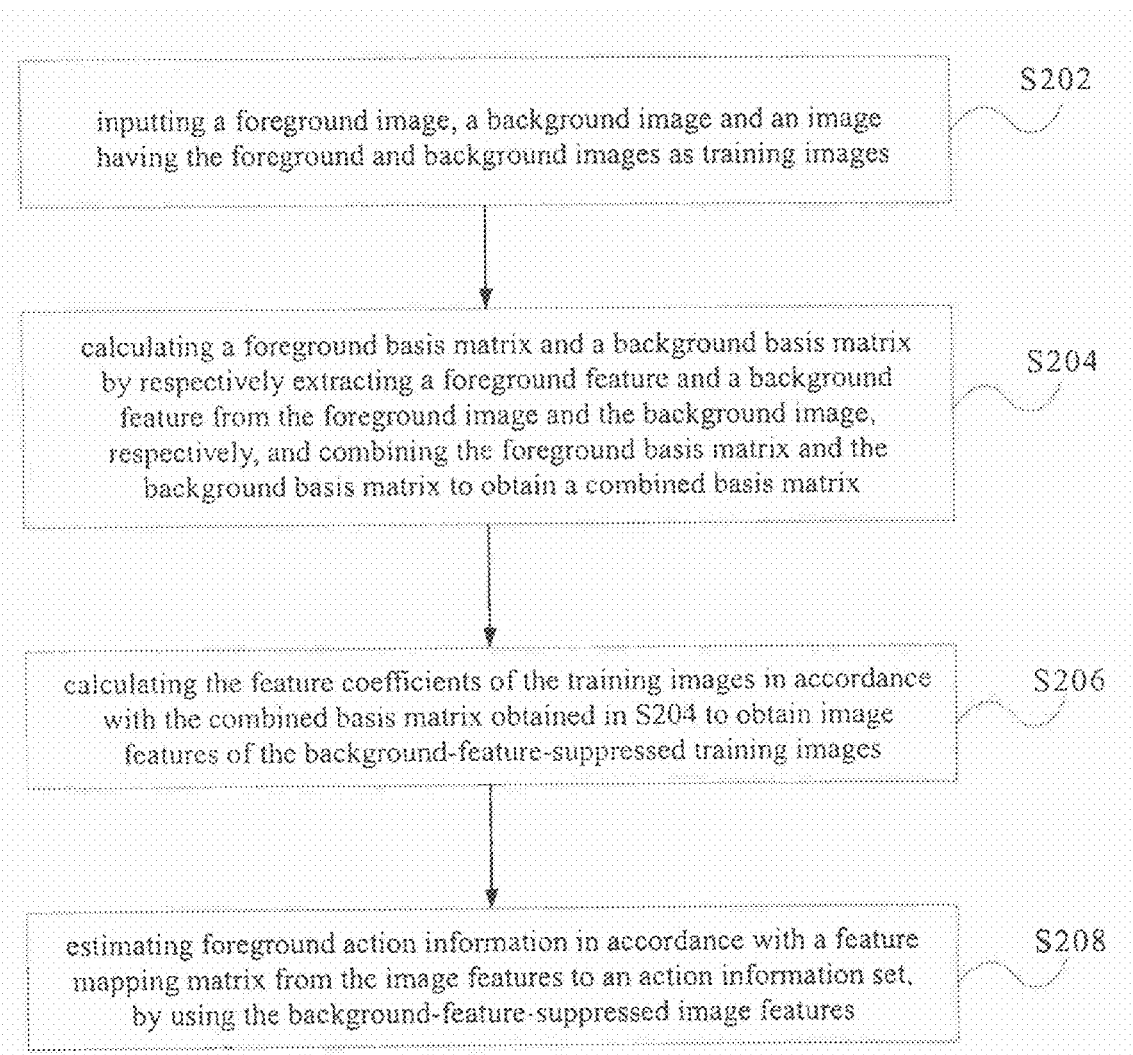
FIG. 2 is a flowchart of a foreground action estimating method according to the present invention.

FIG. 2 is a block diagram of a foreground action estimating method in accordance with the present invention. As shown in FIG. 2, the method comprises steps of:

S202, inputting a foreground image, a background image and an image having the foreground and background images as training images;

S204, calculating a foreground basis matrix and a background basis matrix by respectively extracting a foreground feature and a background feature from the foreground image and the background image, respectively, and combining the foreground basis matrix and the background basis matrix to obtain a combined basis matrix;

S206, calculating the feature coefficients of the training images in accordance with the combined basis matrix obtained in S204 to obtain image features of the background-feature-suppressed training images; and S208, estimating foreground action information in accordance with a feature mapping matrix from the image features to an action information set, by using the background-feature-suppressed image features.

Wherein, the sizes of the foreground image, the background image, and the training images are uniform.

Additionally, the foreground action estimating method further comprises an action information set storing step, wherein the foreground image and the training images correspond to the same action in the action information set.

In S206, the processes as follow are executed: extracting the image features of the training images; calculating the feature coefficients of the image features in the combined basis matrix; separating a background basis coefficient from the feature coefficients so as to obtain a foreground basis coefficient; and reestablishing the background-feature-suppressed image features of the training images by a predetermined algorithm via the foreground basis coefficient and the foreground basis matrix.

In the present invention, the predetermined algorithm is Universal Matrix Multiplication. The foreground feature, the background feature, and the image features are statistical features of the foreground image, the background image, and training images in an edge direction and include at least a HoG feature and a SIFT feature.

In S204, the foreground basis matrix and the background basis matrix are obtained at least via non-negative matrix factorization.

Therefore, a foreground action can be estimated by a background-feature-suppressed image feature obtained by the foreground action estimating apparatus or foreground action estimating method of the present invention in accordance with a feature mapping matrix between the image feature and an action information set.

Figure 3:
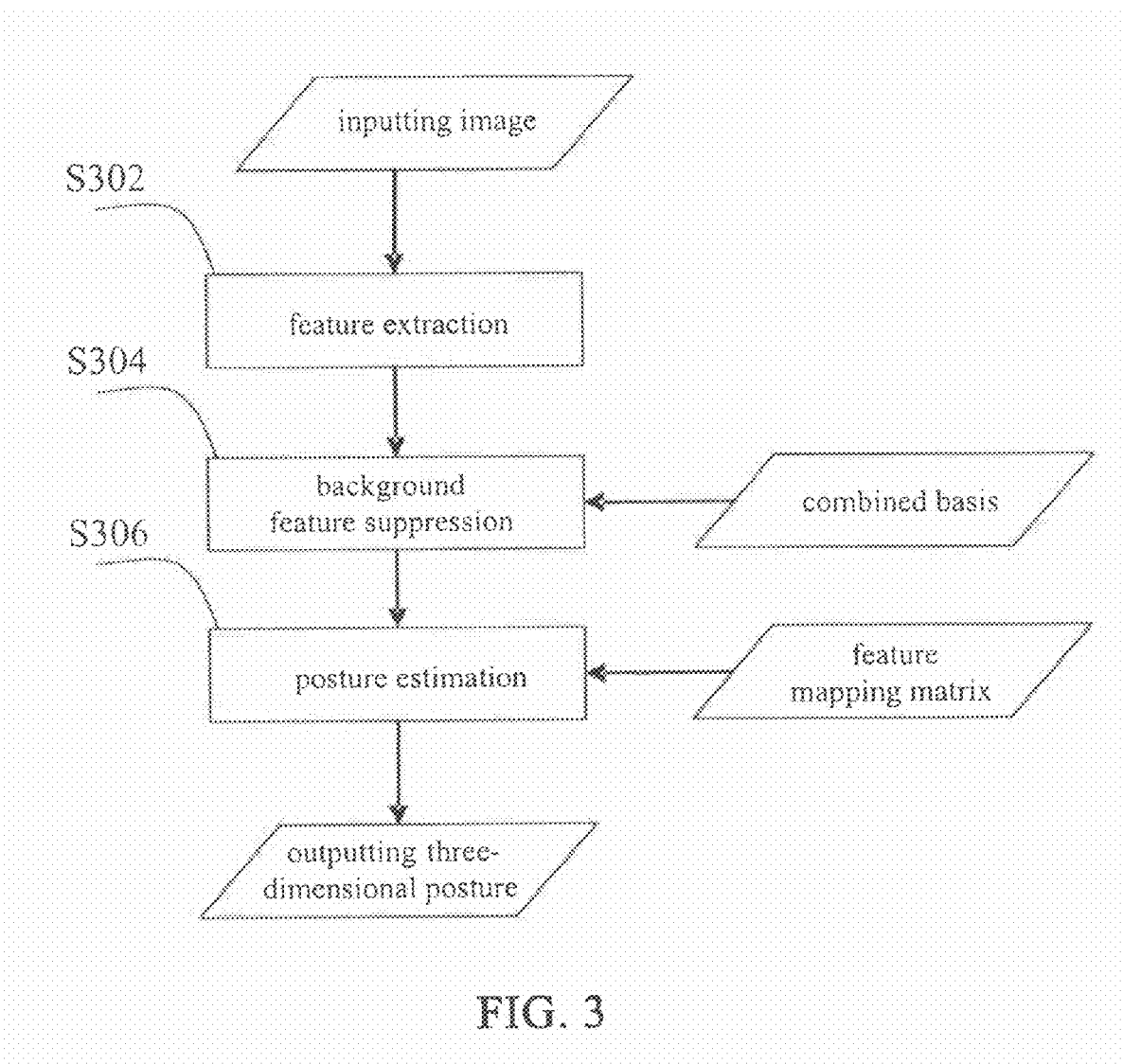
FIG. 3 is a flowchart of a human posture estimating method based on background feature suppression according to an embodiment of the present invention.
Figure 4:
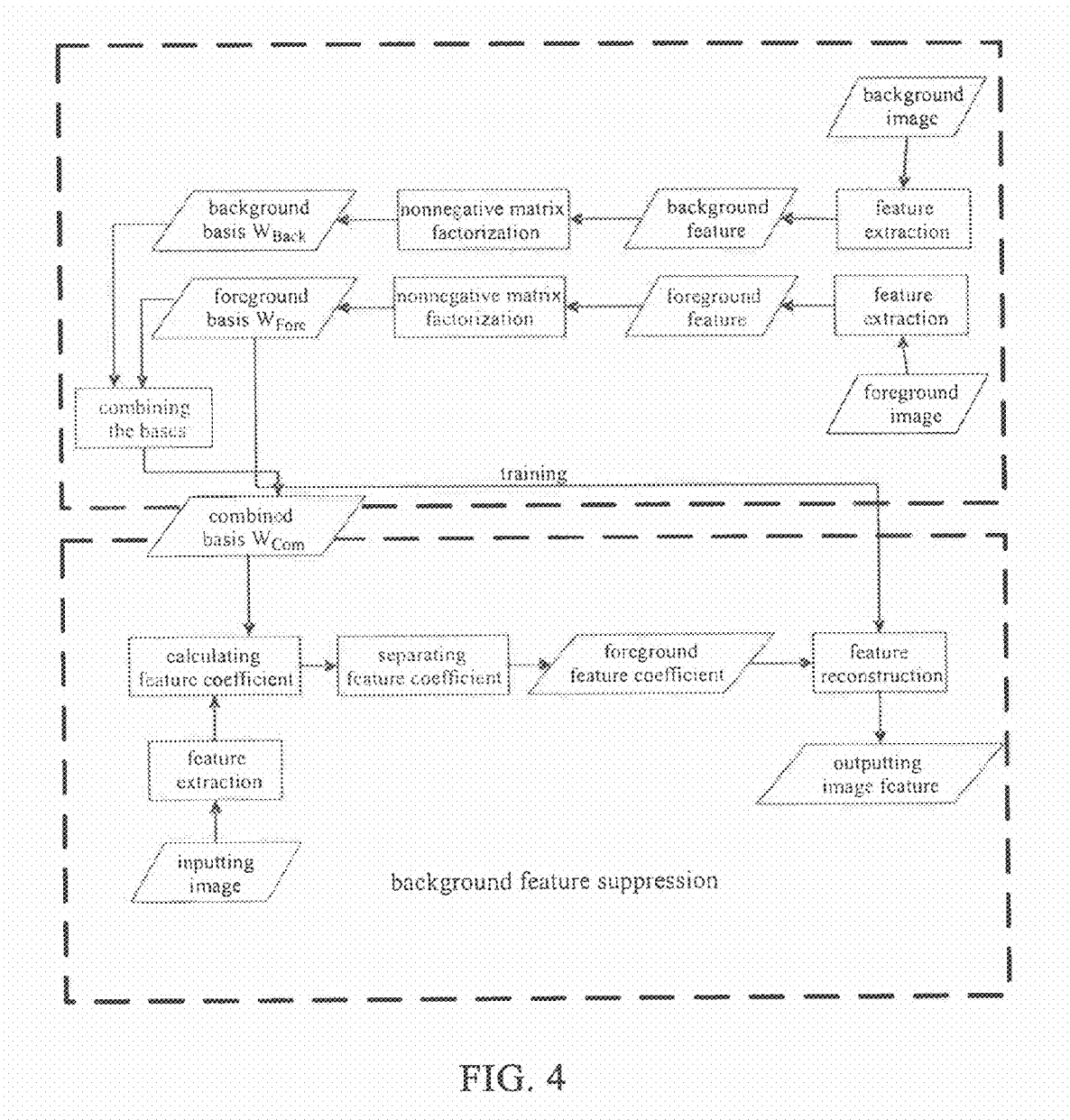
FIG. 4 is a flowchart of background feature suppression training and background feature suppressing process according to an embodiment of the present invention.
Figure 5:
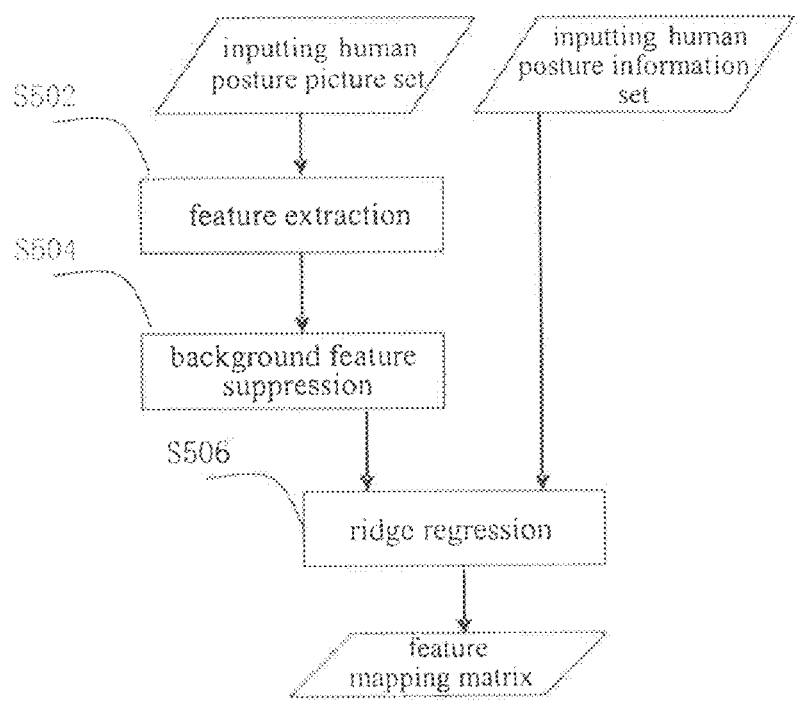
FIG. 5 is a flowchart of posture estimation training process according to an embodiment of the present invention, wherein, (a) denotes an input image, (b) denotes an original image feature, and (c) denotes a reestablished image feature obtained by suppressing a background feature.
Figure 6:
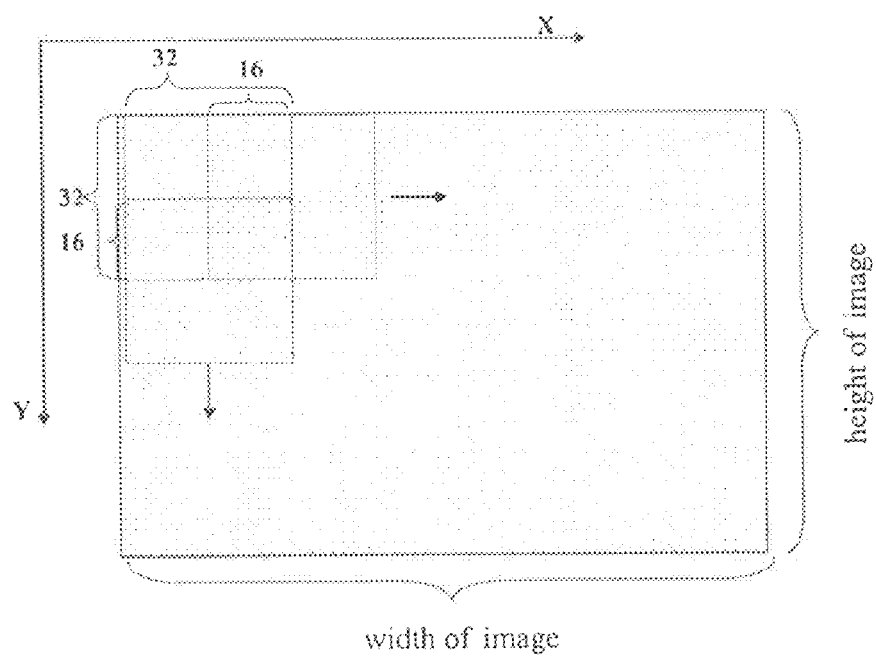
FIG. 6 is a schematic diagram illustrating a block extracting method for calculating an image feature according to an embodiment of the present invention.

Hereinafter, the embodiments of the present invention will be described in more detail with reference to FIGS. 3 to 6. FIG. 3 is a flowchart of a human posture estimating method based on background feature suppression in accordance with the present invention, FIG. 4 is a flowchart of background feature suppression training and background feature suppressing process in accordance with an embodiment of the present invention, FIG. 5 is a flowchart of posture estimation training process in accordance with an embodiment of the present invention, and FIG. 6 is a schematic diagram illustrating a block extracting method for calculating an image feature in accordance with an embodiment of the present invention.

As shown in FIG. 3, the human posture estimating method based on background feature suppression in accordance with the embodiment of the present invention comprises steps of:

S302, obtaining a feature of an input picture, wherein a statistical feature of an image in an edge direction is reliable information for illustrating human posture, preferably, a SIFT feature is used in the present invention as an image feature;

S304, calculating a feature coefficient of the image feature of the input image under a combined basis matrix, separating a background part from the feature coefficient, and reestablishing a background-feature-suppressed image feature with a foreground basis; and S306, estimating human three-dimensional posture corresponding to the background-feature-suppressed image feature in accordance with the feature mapping matrix between the image feature and the three-dimensional posture information.

The step S302 includes calculating steps of:

(1) calculating respectively gradients in a horizontal direction and a vertical direction of each pixel of the image, i.e.

$$\text{horizontal gradient: } I_x(x,y)=d(I(x,y))/dx=I(x+1,y)-I(x-1,y)$$

$$\text{vertical gradient: } I_y(x,y)=d(I(x,y))/dy=I(x,y+1)-I(x,y-1)$$

wherein, I(x,y) denotes a gray value of the image, x and y respectively denote coordinates of the pixel in the horizontal direction and the vertical direction;

(2) calculating respectively a gradient direction and a gradient amplitude of the each pixel of the image, i.e.

$$\text{gradient direction: } \theta(x,y)=argtg(|I_y/I_x|)$$

$$\text{tgradient amplitude: } Grad(x,y)=\sqrt{I_x^2+I_y^2}$$

wherein, the range of the gradient direction $\theta(x,y)$ is $[0, \pi]$;

(3) extracting 24 blocks each having a size of 32×32 from the image in an order from left to right and from top to bottom, wherein, as shown in FIG. 6, there are six blocks in each line in the horizontal direction, and four blocks in each line in the vertical direction, and half block in every two blocks overlaps;

(4) dividing each block of 32×32 into 16 small blocks of 8×8, wherein, there are four small blocks in each line in the horizontal direction, and four small blocks in each line in the vertical direction, and the small blocks are arranged in sequence;

(5) calculating a histogram of the gradient directions of 64 pixels in each small block of 8×8, and dividing the gradient directions into eight direction intervals, i.e. every $\pi/8$ is an interval in the range from 0 to $\pi$, in other words, adding up gradient values in the eight direction intervals in the each small block of 8×8, wherein the gradient directions are weighted based on their respective amplitudes such that an eight-dimensional vector is obtained and a 128-dimensional vector is obtained for each block of 32×32; and (6) obtaining an image feature by connecting the vector of each block sequentially, wherein a dimension of the image feature is 3072, i.e. 128×24=3072.

Figure 7:
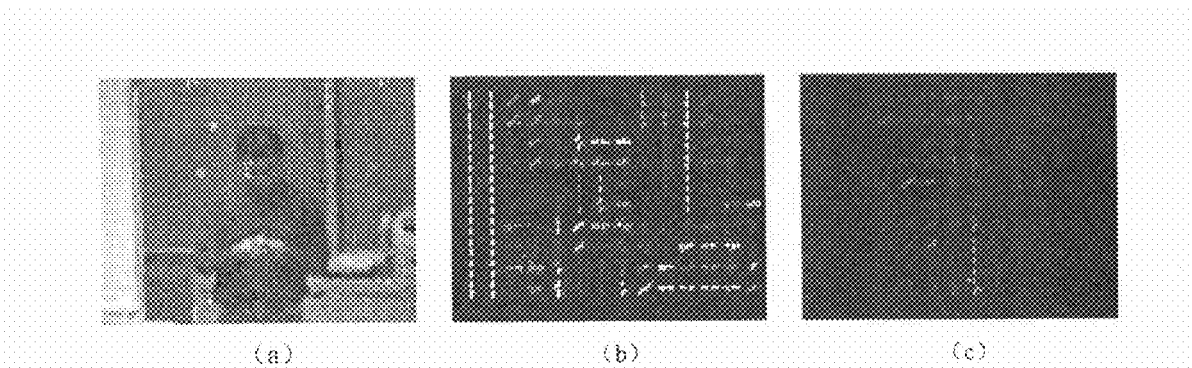
FIG. 7 is a schematic diagram illustrating a background feature suppression effect obtained by the present invention.

The step S304 includes steps of:

(1) extracting a SIFT feature of an image from the input image to obtain $V_{test}$, wherein the input image is shown in FIG. 7(a), and the feature image is shown in FIG. 7(b);

(2) calculating a feature coefficient $H_{Com}$ of the image feature $V_{Test}$ to be processed under a combined basis $W_{Com}$, wherein $H_{Com}$ is calculated by the following linear equation: $V_{Test} = W_{Com} \cdot H_{Com}$, preferably, $H_{Com}$ is calculated by Levenberg-Marquardt algorithm in the present invention;

(3) extracting a foreground part $H_{Fore}$ of the feature coefficient $H_{Com}$ corresponding to a basis $W_{Fore}$, wherein because $H_{Com} = [H_{Fore}^1 : H_{Back}^1, H_{Fore}^2 : H_{Back}^2, \ldots, H_{Fore}^{24} : H_{Back}^{24},]$, $H_{Fore} = [H_{Fore}^1, H_{Fore}^2, \ldots, H_{Fore}^{24}]$; and (4) calculating a reestablished foreground image feature using the extracted feature coefficient $H_{Fore}$ of the foreground part and the foreground basis $W_{Fore}$, i.e. $V_{Test}' = W_{Fore} \cdot H_{Fore}$, the reestablished foreground image feature being shown in FIG. 7(c).

The step S306 includes steps of:

multiplying a feature mapping matrix Map by a vector $V_{test}'$ of the reestablished foreground image feature to obtain a posture feature vector Pos, i.e. Pos=Map·$V_{test}'$, and outputting the three-dimensional posture information Pos.

FIG. 4 is a flowchart of background feature suppression training and background feature suppressing process in accordance with an embodiment of the present invention. In the present invention, a training picture set is composed of a foreground picture (human) set and a background picture set, and pictures in the training set have been set to pictures having uniform width and height (120×100).

As shown in FIG. 4, the process includes steps of:

calculating a feature of a background picture in the training picture set, and using a SIFT feature as an image feature, the calculating step being the same as S302;

training to obtain a basis matrix $W_{Back}$ of a background feature image using nonnegative matrix factorization which factorizes a nonnegative matrix $V_{m*n}$ into a product of two nonnegative matrixes, i.e. $V_{m*n} = W_{m*r} \cdot H_{r*n}$, wherein W is a basis matrix of V, H is a feature coefficient matrix corresponding to W, m is a dimension of the feature, and r is a dimension of the feature coefficient, since r<m, the nonnegative matrix factorization also can achieve an object of feature compression;

calculating a feature of a foreground picture in the training picture set, and using a SIFT feature as an image feature, the calculating step being the same as S302;

training to obtain a basis matrix $W_{Fore} = \{W_{Fore}^1, W_{Fore}^2, \ldots, W_{Fore}^{24}\}$ the foreground picture, the calculating step being the same as S304; and combining the foreground basis with the background basis to obtain a combined basis $W_{Com}$ a combination method of $W_{Com} = [W_{Fore}^1 : W_{Back}^1, W_{Fore}^2 : W_{Back}^2, \ldots, W_{Fore}^{24} : W_{Back}^{24},]$.

In the present invention, the basis matrix of the image is factorized by nonnegative matrix factorization as follows:

(1) connecting features in each block of $N^{back}$ pictures sequentially in accordance with the calculated features of the training picture set to obtain a matrix of $V_{train}^{back}$ in which each line is an image feature of each background picture in the training picture set and which is a 3072×$N^{back}$ dimensional matrix, and finally obtaining a collection $\{V_{train}^{back(i)} | i=1, 2, \ldots, 24\}$ background feature matrixes, wherein $N^{back}$ denotes the number of the background pictures in the training picture set;

(2) factorizing $V_{train}^{back(i)}$ into a product of $W_{back}^{(i)}$ and $H_{back}^{(i)}$ using nonnegative matrix factorization method, i=1, 2, \ldots, 24 (herein, r=30, it is indicated by experimental results that the best compression ratio and performance ration can be obtained when r=30), and training each block to obtain a basis matrix $W_{back}^{(i)}$, i=1, 2, \ldots, 24; and (3) obtaining a collection $W_{Back} = \{W_{Back}^1, W_{Back}^2, \ldots, W_{Back}^{24}\}$ background basis matrixes.

FIG. 5 is a flowchart of posture estimation training process in accordance with an embodiment of the present invention. In the present invention, the training set is composed of a human posture picture set and a posture information set, wherein human posture pictures in the human posture picture set are respectively corresponding to human posture information in the posture information set. The specific posture estimation training process includes:

step S502, extracting an image feature of each picture in the human posture picture set, and using a SIFT feature as the image feature, the calculating step being the same as the step S302;

step S504, suppressing background features of the image features of the human posture pictures in the training picture set, the calculating step being the same as the step S304; and step S506, training to obtain a feature mapping matrix between the image features and three-dimensional posture information using the image feature set and posture information set in the training set.

In the step S506, firstly, image features of all the pictures in the human posture picture set are connected in sequence to obtain a matrix of $V_{train}^{Feature}$ in which each line is an image feature of each of the human posture pictures in the training picture set and which is a 3072×$N^{Feature}$-dimensional matrix, wherein $N^{Feature}$ denotes the number of pictures in the training picture set. Then, posture information corresponding to the human posture pictures in the posture information set is connected to obtain a matrix of $Pos_{train}$ in which each line is a vector pos of each human posture information in the posture information set and which is a 24×$N^{Feature}$-dimensional matrix, wherein pos is defined as three-digit coordinates of eight parts, i.e. head, waist, left wrist, left arm, left shoulder, right wrist, right arm and right shoulder, of a person, thus pos=$[x_1, y_1, z_1, x_2, y_2, z_2, \ldots, x_{24}, y_{24}, z_{24}]^T$. Finally, the best answer of the following linear equations: Map·$V_{train}^{Feature}$=$Pos_{train}$ is obtained by ridge regression method.

Figure 8:
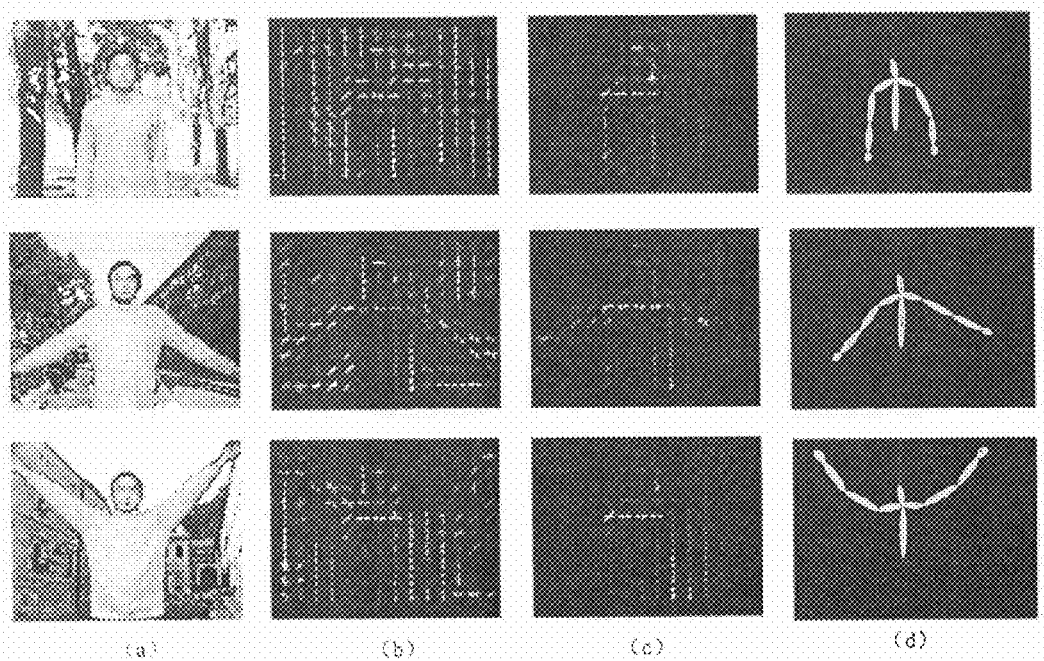
FIG. 8 is a schematic diagram illustrating a human posture estimation effect obtained by the present invention.

A human posture estimation effect obtained by the present invention is shown in FIG. 8. In FIG. 8, (a) is an input image, (b) is a feature image of the input image, (c) is a feature image obtained by suppressing a background feature using the present invention, and (d) is a posture image, in which the posture is estimated, obtained by the present invention.

As stated above, in accordance with the present invention, a background feature in an image having a complicated background is suppressed, so that a foreground feature (human posture information) is remained and relatively strengthened, and accuracy of estimation of a three-dimensional posture of a human body from a two-dimensional single view image is remarkably improved.

The foregoing only illustrates the preferred embodiments of the present invention, and is not a limit to the present invention. It should be understood by those skilled in the art that various modifications and alterations of the present invention are possible. All changes, equivalents and alterations that fall within the sprit and principle of the present invention are intended to be embraced within the scope defined by the present invention.

What is claimed is:

1. A foreground action estimating apparatus for estimating foreground actions in a picture comprising:
    a training image inputting means for inputting a foreground image, a background image and an image having the foreground and background images as training images;
    a basis matrix calculating means for calculating a foreground basis matrix and a background basis matrix by respectively extracting a foreground feature and a background feature from the foreground image and the background image, respectively, and combining the foreground basis matrix and the background basis matrix to obtain a combined basis matrix;
    a feature suppressing means for calculating feature coefficients of the training images in accordance with the combined basis matrix obtained by the basis matrix calculating means to obtain background-feature-suppressed image features of the training images; and
    a foreground action information acquiring means for estimating foreground action information in accordance with a feature mapping matrix from the image features to an action information set, by using the background-feature-suppressed image features.

2. The foreground action estimating apparatus according to claim 1, wherein sizes of the foreground image, the background image, and the training images are uniform.

3. The foreground action estimating apparatus according to claim 1 further comprising a storage unit for storing the action information set,
    wherein the foreground image and the training images correspond to the same action in the action information set.

4. The foreground action estimating apparatus according to claim 3, wherein the feature suppressing means comprises:
    a feature extracting unit for extracting the image features of the training images;
    a calculating unit for calculating the feature coefficients of the image features in the combined basis matrix;
    a separating unit for separating a background basis coefficient from the feature coefficients so as to obtain a foreground basis coefficient; and
    a reestablishing unit for reestablishing the background-feature-suppressed image features of the training images by a predetermined algorithm by using the foreground basis coefficient and the foreground basis matrix.

5. The foreground action estimating apparatus according to claim 4, wherein in the reestablishing unit, the predetermined algorithm is Universal Matrix Multiplication.

6. The foreground action estimating apparatus according to claim 1, wherein the foreground basis matrix and the background basis matrix in the basis matrix calculating means are obtained at least via non-negative matrix factorization.

7. The foreground action estimating apparatus according to claim 1, wherein the foreground image includes at least a person and the foreground actions includes at least a posture.

8. The foreground action estimating apparatus according to any one of the preceding claims, wherein the foreground feature, the background feature, and the image features are statistical features of the foreground image, the background image, and training images in an edge direction and include at least a HoG feature and a SIFT feature.

9. A foreground action estimating method for estimating foreground actions in a picture comprising the following steps:
    a training image inputting step for inputting a foreground image, a background image and an image having the foreground and background images as training images;
    a basis matrix calculating step for calculating a foreground basis matrix and a background basis matrix by respectively extracting a foreground feature and a background feature from the foreground image and the background image, respectively, and combining the foreground basis matrix and the background basis matrix to obtain a combined basis matrix;
    a feature suppressing step for calculating the feature coefficients of the training images in accordance with the combined basis matrix obtained in the basis matrix calculating step to obtain image features of the background-feature-suppressed training images; and
    a foreground action information acquiring step for estimating foreground action information in accordance with a feature mapping matrix from the image features to an action information set, by using the background-feature-suppressed image features.

10. The foreground action estimating method according to claim 9, wherein sizes of the foreground image, the background image, and the training images are uniform.

11. The foreground action estimating method according to claim 9 further comprising an action information set storing step,
    wherein the foreground image and the training images correspond to the same action in the action information set.

12. The foreground action estimating method according to claim 11, wherein the feature suppressing step executes the processing of:
    extracting the image features of the training images;
    calculating the feature coefficients of the image features in the combined basis matrix;
    separating a background basis coefficient from the feature coefficients so as to obtain a foreground basis coefficient; and
    reestablishing the background-feature-suppressed image features of the training images by a predetermined algorithm via the foreground basis coefficient and the foreground basis matrix.

13. The foreground action estimating method according to claim 12, wherein the predetermined algorithm is Universal Matrix Multiplication.

14. The foreground action estimating method according to claim 9, wherein in the basis matrix calculating step, the foreground basis matrix and the background basis matrix are obtained at least via non-negative matrix factorization.

15. The foreground action estimating method according to claim 9, wherein the foreground image includes at least a person and the foreground actions includes at least a posture.

16. The foreground action estimating method according to any one of claims 9-15, wherein the foreground feature, the background feature, and the image features are statistical features of the foreground image, the background image, and training images in an edge direction and include at least a HoG feature and a SIFT feature.

* * * * *